(12) United States Patent
Gutierrez et al.

(10) Patent No.: US 11,150,899 B2
(45) Date of Patent: Oct. 19, 2021

(54) SELECTING A PRECISION LEVEL FOR EXECUTING A WORKLOAD IN AN ELECTRONIC DEVICE

(71) Applicant: Advanced Micro Devices, Inc., Santa Clara, CA (US)

(72) Inventors: Anthony T. Gutierrez, Seattle, WA (US); Sergey Blagodurov, Seattle, WA (US); Scott A. Moe, Redmond, WA (US); Xianwei Zhang, Bellevue, WA (US); Jieming Yin, Bellevue, WA (US); Matthew D. Sinclair, Redmond, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 91 days.

(21) Appl. No.: 15/948,795

(22) Filed: Apr. 9, 2018

(65) Prior Publication Data
US 2019/0310864 A1    Oct. 10, 2019

(51) Int. Cl.
   *G06F 9/30* (2018.01)
   *G06F 8/71* (2018.01)
   *G06N 3/063* (2006.01)
   *G06N 3/08* (2006.01)

(52) U.S. Cl.
   CPC ............ *G06F 9/30014* (2013.01); *G06F 8/71* (2013.01); *G06N 3/063* (2013.01); *G06N 3/08* (2013.01)

(58) Field of Classification Search
   CPC ............................. G06F 9/44505; G06N 3/08
   See application file for complete search history.

(56) References Cited

U.S. PATENT DOCUMENTS

| | | | | |
|---|---|---|---|---|
| 9,396,160 | B1 * | 7/2016 | Aithal | G06F 11/3684 |
| 2009/0265156 | A1 * | 10/2009 | Taillefer | G06F 9/45504 |
| | | | | 703/21 |
| 2017/0171231 | A1 * | 6/2017 | Reybok, Jr. | H04L 63/0428 |
| 2018/0307971 | A1 * | 10/2018 | Sinha | G06F 15/78 |

\* cited by examiner

*Primary Examiner* — William B Partridge
(74) *Attorney, Agent, or Firm* — Park, Vaughan, Fleming & Dowler LLP

(57) ABSTRACT

An electronic device includes a controller functional block and a computational functional block. During operation, while the computational functional block executes a test portion of a workload at at least one precision level, the controller functional block monitors a behavior of the computational functional block. Based on the behavior of the computational functional block while executing the test portion of the workload at the at least one precision level, the controller functional block selects a given precision level from among a set of two or more precision levels at which the computational functional block is to execute a remaining portion of the workload. The controller functional block then configures the computational block to execute the remaining portion of the workload at the given precision level.

20 Claims, 4 Drawing Sheets

SELECTING A PRECISION LEVEL FOR EXECUTING A WORKLOAD IN AN ELECTRONIC DEVICE

BACKGROUND

Related Art

The designers of modern integrated circuit chips are saddled with the difficult task of balancing the performance and power consumption of the chips. For example, designers designing chips for battery-powered devices typically face strict power consumption constraints, but must also meet ever-increasing consumer performance demands. Considerable effort is therefore applied to designing, arranging, and using integrated circuits on chips so that increased performance can be wrung from the chips while remaining within power consumption constraints.

In many cases, integrated circuit chips execute workloads that include operations for which a precision of operands and/or results is specified in advance or "statically" specified. For example, a software application executed by a chip (e.g., a microprocessor, a compute unit, etc.) may be compiled with a specification of a precision such as 64 bit floating point operands and results. In some cases, such software applications include operations that do not necessarily require the full specified precision. For example, a software application may use an artificial neural network to perform classification tasks such as image classification (e.g., whether or not an image is likely to include a particular item, such as a car or a dog). When performing such classification tasks, neural networks may be able to produce results that are sufficiently accurate without requiring the full specified precision be used for operands and results within the neural network. In other words, and continuing the example above, a neural network may properly identify an image as being likely to include a dog or a car using lower-precision operands and/or results than were specified in the software application. Other types of operations have the same property, in that results that are sufficiently accurate can be produced from computations using lower-precision operands and results. For example, operations such as machine learning/deep learning applications, graphics or audio processing, counter value estimates, trend computations, and computations that need only be accurate to a small number of decimal points (e.g., certain financial computations, etc.) may not require the use of specified higher-precision operands and results. Because it may be unnecessary to use the specified precision of operands and results, an integrated circuit that is performing the computations may needlessly consume power when performing the computations using the specified precision operands and results. Given that, as described above, operating within power constraints is already difficult, avoiding such unnecessary power consumption would be beneficial.

BRIEF DESCRIPTION OF THE FIGURES

Throughout the figures and the description, like reference numerals refer to the same figure elements.

DETAILED DESCRIPTION

Figure 1:
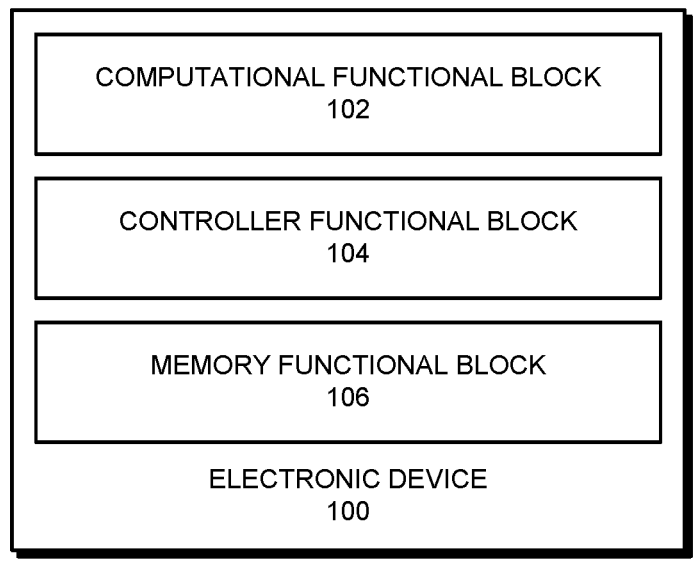
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of some of these terms. Note that the terms may have significant additional aspects that are not recited herein for clarity and brevity and thus the description is not intended to limit the terms.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory), etc.

Workload: a workload includes a sequence or group of one or more related or unrelated computational, processing, control, and/or other operations that are performed by one or more functional blocks in an electronic device to execute the workload. A workload may include operations that are performed for or otherwise caused by hardware entities such as other functional blocks or software entities such as software applications, routines, kernels, or operating systems. In other words, a functional block or portion thereof may execute a workload for a hardware entity or a software entity executing on that or another functional block. For example, a software application may include or implement a neural network that is used for classifying images, and one or more functional blocks may perform, as respective workloads, computational or processing operations for nodes in the neural network (e.g., matrix processing operations, individual node activation function and weighting computations, training operations, etc.). In some embodiments, when performing operations for a workload, a functional block executes instructions from program code.

Overview

The described embodiments include an electronic device with a computational functional block that executes workloads. For example, when executing a workload, the computational functional block may perform operations for or on behalf of a hardware entity (e.g., another functional block, etc.) or a software entity (e.g., a software application, etc.). The electronic device also includes a controller functional block that dynamically configures the computational functional block to use precision levels from a set of precision levels when executing workloads. For example, the controller functional block can, as the electronic device operates, configure/reconfigure the computational functional block to use a particular operand and/or result precision level (or bit width) among a set of two or more operand and/or result precision levels. The precision levels, and thus the bit widths used for operands and/or results, can include any bit width that can be operated on by the computational functional block, from 1 bit to 256 bits and more.

In some embodiments, when configuring the computational functional block to use a given precision level for executing a workload, circuit elements that are not used for executing the workload at the precision level are disabled, halted, or otherwise configured to reduce power consumption, heat generated, etc. (e.g., via reduced voltages, clock speeds, etc.). For example, the computational functional block may include separate circuit elements configured to operate using operands and/or results of each respective precision level, such as a separate ALU, compute unit, or execution pipeline for each precision level. In these embodiments, the separate circuit elements are enabled or disabled based on the precision level for which the computational functional block is configured. As another example, the computational functional block may include a set of circuit elements that are operable at various precision levels via enabling/disabling subsets of circuit elements within the single set of circuit elements, such as an N bit-wide ALU (where N is 256, 128, 64, or another number) that can be configured via disabling respective subsets of circuit elements to operate on operands having numbers of bits less than N.

In some embodiments, when dynamically configuring the precision level for the computational functional block, the controller functional block selects a precision level from among the set of precision levels. In some of these embodiments, the controller functional block checks one or more precision levels to determine a precision level from among the set of precision levels at which the computational functional block is to be configured. In these embodiments, for each of the one or more precision levels being checked, the controller functional block configures the computational functional block to execute a test portion of a workload using the precision level. The test portion is typically a small (and perhaps very small) portion of the workload, but is sufficiently large to be representative of a behavior of the computational functional block when executing a remaining portion of the workload at the precision level. Based on the behavior of the computational functional block when executing the test portion of the workload at each of the one or more precision levels, the controller functional block selects a given precision level to be used. For example, the behavior can be accuracies or values of outputs of a classification operation for a neural network that are generated by the computational functional block. In this case, if executing the test portion of the workload at a higher-precision precision level of the two or more precision levels proves to return more accurate results, or results for which the precision of the higher-precision precision level is reflected in a useful difference (e.g., a difference that might be lost at a lower-precision precision level), the higher-precision precision level can be selected as the given precision level. Note that the higher-precision precision level is generally associated with higher power consumption, as circuit elements with more transistors are used for performing the operations, more bits are communicated within the electronic device, etc., so the selection of the higher-precision precision level is associated with a cost that can be balanced by the useful difference in the results. In some embodiments, which precision level is selected as the given precision level is based on one or more thresholds to which the behavior is compared.

In some embodiments, the electronic device includes multiple versions of a software application, each version being compiled for or otherwise configured to operate at a different precision level from the set of precision levels. In these embodiments, a corresponding version of the software application is used by the computational functional block for executing workloads at a given precision level. In some embodiments, the electronic device includes a single software application with generic instructions that can be configured (via runtime preprocessing or on the fly) to be executed using a given precision level from the set of precision levels. In these embodiments, the controller functional block or computational functional block configures and uses the single software application for use for executing workloads at a specified precision level.

In some embodiments, the controller functional block receives a hint or indication that a specified precision level is to be used for a given workload and/or for the above-described check of the one or more precision levels. For example, in some embodiments, a software application for whom the workload is executed may indicate a preferred precision level, one or more precision levels to be checked, etc.

By dynamically selecting precision levels to which the computational functional block is to be configured as described herein, the described embodiments may be able to use lower-precision precision levels in situations where higher precisions (e.g., statically specified precision levels in software applications) might otherwise be used. This can help to avoid the consumption of electrical power, avoid the generation of heat, and improve the speed at which operations are performed, which can, in turn, improve the overall power consumption and performance of the electronic device. These embodiments are therefore an improvement over existing electronic devices that do not include the capability to dynamically set precision levels for workloads.

Electronic Device

FIG. 1 presents a block diagram illustrating an electronic device 100 in accordance with some embodiments. As can be seen in FIG. 1, electronic device 100 includes computational functional block 102, controller functional block 104, and memory functional block 106. As described herein, computational functional block 102, controller functional block 104, and memory functional block 106 perform operations associated with the dynamic selection of precision levels at which electronic device 100 operates.

Computational functional block 102 is a functional block that performs operations for executing workloads such as performing operations for hardware entities (e.g., other functional blocks, etc.) or software entities (e.g., software applications, etc.). For example, computational functional block may be or include a central processing unit (CPU), a general purpose graphics processing unit (GPGPU), an application specific integrated circuit (ASIC), or a portion thereof, such as an execution pipeline or arithmetic logic unit (ALU) in a CPU or a compute unit in a GPGPU. Computational functional block 102 is implemented in hardware, i.e., using various circuit elements and devices. For example, computational functional block 102 can be entirely fabricated on one or more semiconductor chips, can be fashioned from semiconductor chips in combination with discrete circuit elements, can be fabricated from discrete circuit elements alone, etc.

In the described embodiments, computational functional block 102 includes circuit elements that execute workloads using one of two or more precision levels, with each precision level being characterized at least in part by a number of bits (or "bit width") used for operands and/or results during operations. For example, computational functional block may include circuit elements for, and thus support, executing workloads using precision levels/bit widths for operands and/or results that include 16 bit values (e.g., floating point values, etc.), 32 bit values, 64 bit values, etc. In these embodiments, computational functional block 102 is dynamically configurable to use a specified one of the precision levels for executing a given workload as described herein.

Figure 2:
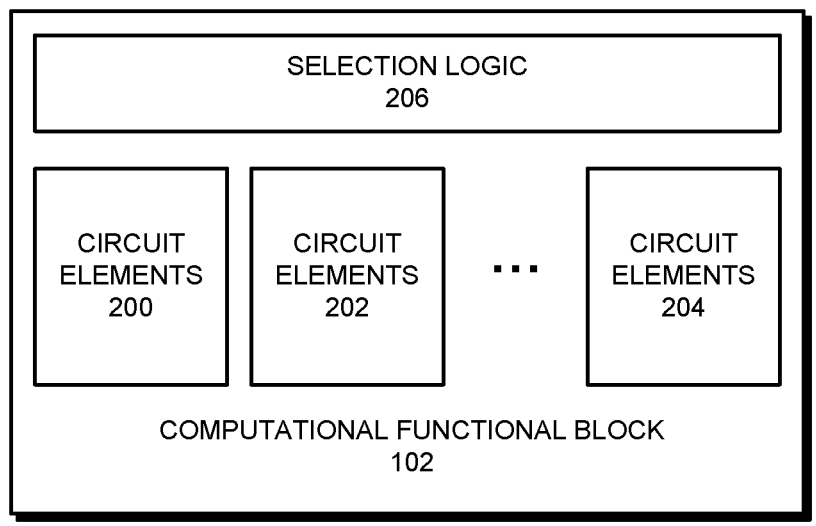
FIG. 2 presents a block diagram illustrating a computational functional block in accordance with some embodiments.

In some embodiments, computational functional block 102 includes a separate set of circuit elements for each of two or more supported precision levels. FIG. 2 presents a block diagram illustrating computational functional block 102 in accordance with some embodiments. As can be seen in FIG. 2, computational functional block 102 includes three separate sets of circuit elements 200-204. Each set of circuit elements 200-204 includes circuits such as processing circuits, ALUs, pipelines, compute units, registers, memory elements, communication routes, etc. that are used for performing operations at the particular precision level. In other words, each of circuit elements 200-204 is arranged for performing operations using operands and/or results of a different bit width. For example, circuit elements 200 may have a bit width of 16 bits (and thus be configured to perform operations using 16 bit operands and/or results), circuit elements 202 may have a bit width of 80 bits, and circuit elements 204 may have a bit width of 128 bits.

In some embodiments, one or more of circuit elements 200-204 may be disabled while other(s) of circuit elements 200-204 remain enabled for executing workloads. For example, and continuing the example above, if computational functional block 102 is executing a workload using a precision level of 80 bits, which is executed using circuit elements 202, both of circuit elements 200 and 204 may be disabled. In these embodiments, circuit elements such as circuit elements 200 and 204 may be "disabled" by being powered down, slowed/halted, blocked, or otherwise removed from operation. For example, circuit elements may be disabled by having an electrical power supply cut off or reduced (e.g., by limiting supply voltage and/or current), having a controlling clock reduced in speed or halted (such as by clock gating), having circuit elements disabled using control signals, etc. Note that, in some embodiments, the "disabling" applies to only certain portions of circuit elements. For example, computational elements within circuit elements may be disabled, while control elements, state elements, and/or memory elements are left operational (e.g., to retain/maintain an operational state, etc.).

Selection logic 206 is a functional block that performs operations for enabling or disabling circuit elements 200-204 as described above. In some embodiments, selection logic 206 communicates or otherwise interacts with controller functional block 104 to determine which circuit elements are to be enabled or disabled.

In some embodiments, only certain circuit elements for executing a workload are separate as shown in FIG. 2. For example, a set of basic processing circuits may be included in each of circuit elements 200-204. The "basic" circuit elements include a set of processing circuits used for performing specified operations, such as mathematical, logical, or bitwise operations, at a given precision level/bit width. In these embodiments, other elements, such as register files, memory elements, control elements, communication routes, etc. are shared between circuit elements 200-204. The other elements are of a sufficient bit width to interact and interface with each of circuit elements 200-204. In some of these embodiments, conversion, truncation, or rounding operations may be performed to use operands and results of a first bit width when used for performing processing operations for a smaller/narrower bit width or vice versa—and unneeded elements (e.g., individual bits within communication routing elements, etc.) may be disabled.

Figure 3:
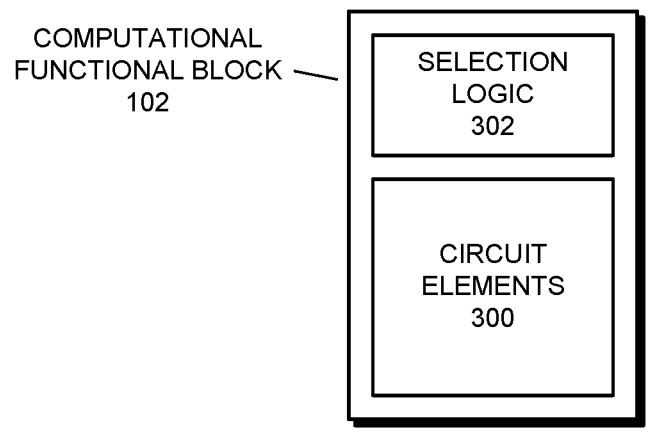
FIG. 3 presents a block diagram illustrating a computational functional block in accordance with some embodiments.

In some embodiments, computational functional block 102 includes a single set of circuit elements that can be used for executing workloads at all supported precision levels. FIG. 3 presents a block diagram illustrating computational functional block 102 in accordance with some embodiments. As can be seen in FIG. 3, computational functional block 102 includes only one set of circuit elements 300. Circuit elements 300 include circuits such as processing circuits, ALUs, pipelines, compute units, registers, memory elements, communication routes, etc. that are able to perform operations at a highest precision level (e.g., using 128 bit operands and/or results). Circuit elements 300 are, however, capable of being configured to perform operations at lower precision levels. For example, circuit elements 300 may include mechanisms, such as electrical power or clock controlling circuits, logic, conversion circuits, etc., that are used to reduce the amount of active circuitry to that which is used for performing operations at precision levels lower than the highest precision level. Circuit elements 300 can therefore be configured to operate on operands and/or results of bit widths narrower than the highest precision level (e.g., using 64 bit or 8 bit operands and results). In these embodiments, a portion of circuits in circuit elements 300 can be disabled when not being used for performing computations at a given precision level. For example, an ALU in circuit elements 300 may include mechanisms for configuring the bit width of operands and/or results used by the ALU from a highest-precision precision level (e.g., 128 bit) to a lowest-precision precision level (e.g., 16 bit), such as by powering down, halting clocks to, etc. portions of the ALU that are not used in computations for lower precision levels. In these embodiments, computational functional block 102 is dynamically configurable to use a specified one of the precision levels for executing a given workload as described herein.

Selection logic 302 is a functional block that performs operations for enabling or disabling circuits within circuit elements 300 as described above. In some embodiments, selection logic 302 communicates or otherwise interacts with controller functional block 104 to determine which circuits are to be enabled or disabled.

Controller functional block 104 is a functional block that performs operations for configuring computational functional block 102 to use a particular precision level (or bit width) from among a number of supported precision levels for executing a workload. In these embodiments, controller functional block 104 can, for some or all of a set of computational operations (e.g., mathematical, logical, bitwise, etc.) associated with a workload for a software application or other entity in electronic device 100, configure the computational functional block 102 to use a specified precision level when performing the computational operations. For example, assume that the workload is processing for a neural network, and thus the computational operations for the workload are operations such as weighting computations or activation function computations. For this example, controller functional block 104 can configure computational functional block 102 to use a specified precision level—and thus the corresponding bit width—when performing the computational operations associated with the processing for the neural network. Controller functional block 104 is implemented in hardware, i.e., using various circuit elements and devices. For example, controller functional block 104 can be entirely fabricated on one or more semiconductor chips, can be fashioned from semiconductor chips in combination with discrete circuit elements, can be fabricated from discrete circuit elements alone, etc.

In some embodiments, when configuring computational functional block 102 to use a specified precision level to perform computational operations, controller functional block 104 communicates with selection logic (e.g., selection logic 206, selection logic 302, etc.) to cause the selection logic to configure circuit elements in computational functional block 102 (e.g., circuit elements 200-204, circuit elements 300, etc.) use the specified precision level. For example, controller functional block 104 can communicate an indication of a given precision level to the selection logic, thereby causing the selection logic to enable or disable circuit elements or portions thereof that will be used or unused for performing computational operations for the workload.

In some embodiments, controller functional block 104 dynamically configures computational functional block 102 to use specified precision levels when executing workloads. In other words, at one or more times while electronic device 100 operates, controller functional block 104 configures and/or reconfigures computational functional block 102 to use a given precision level. The one or more times can include any time during the operation of electronic device 100, such as at startup, when a particular workload commences, when a software application changes operating phases, when a software application changes, when a specified event occurs, upon receiving a request from a software or hardware entity in electronic device 100, at one or more specified times (such as every N seconds, where N is a number greater than zero), etc. In these embodiments, configuring or reconfiguring computational functional block means changing the precision level from a first precision level to a second precision level from among a set of two or more precision levels. For example, assuming that the precision levels include floating point operands and/or results of 8 bits, 64 bits, and 256 bits, controller functional block 104 can configure and reconfigure computational functional block 102 to use any one of the precision levels (and thus bit widths) at any time.

In some embodiments, controller functional block 104 determines a particular precision level to which computational functional block 102 is to be configured based on a behavior of computational functional block 102. For example, in some of these embodiments, controller functional block 104 monitors a behavior of computational functional block 102 as computational functional block 102 executes a portion of a workload, which may be called a "test portion"—and may actually cause computational functional block 102 to execute the test portion so that the behavior can be monitored. Controller functional block 104 then uses the behavior of computational functional block 102 while executing the test portion to determine a precision level to which the computational functional block 102 is to be configured for executing a remainder of the workload, which may be called a "remaining portion" herein. In these embodiments, the "behavior" of computational functional block 102 is a behavior of computational functional block 102 that directly or indirectly indicates the performance, operational efficiency, and/or other operational metric(s) of computational functional block 102 while executing the test portion. There are numerous behaviors of computational functional block 102 that can directly or indirectly indicate performance, etc. of computational functional block 102, such as a speed of completing operations, a total number or rate of operations performed, a convergence on a target value or a convergence rate, a number of errors or error rate, a memory bandwidth consumption, a load on other functional blocks, an active/idle time for portions of circuit elements, an estimated or measured power consumption while executing the test portion, an amount of heat generated while executing the test portion, etc. For example, assuming that the test portion is a portion of a training workload for a neural network, the behavior can be a number of iterations until a termination condition is reached, with the termination being a specified relative magnitude of change in weight value(s) for the neural network between training iterations, a classification error value, etc. As another example, assuming that the test portion is performing a number of classification tasks using a trained neural network, the behavior can be a value or precision of results. In these embodiments, the behavior of computational functional block 102 while executing the test portion of the workload can be compared to one or more thresholds to determine which precision level is to be used for executing the remaining portion of the workload. Continuing the examples above, a threshold may be a specified number of training iterations to reach a termination condition, etc.

In some embodiments, controller functional block 104 causes computational functional block 102 to execute the test portion at each of two or more precision levels and compares the behavior of computational functional block 102 for each precision level to determine which of the two or more precision levels are to be used. For example, controller functional block 104 may cause computational functional block 102 to execute the test portion at a higher-precision precision level (e.g., 64 bit operands and/or results) and a lower-precision precision level (e.g., 8 bit operands and/or results) and determine if a difference in the behavior at each of the precision levels exceeds a threshold. Continuing the example above where the workload is a training workload for a neural network, the threshold may be a magnitude of a difference in a number of training iterations to reach a specified termination condition. Generally, the threshold is selected so that controller functional block 104 can determine if, based on the test portion, executing the remaining portion of the workload at a higher-precision precision level/bit width, with the attendant relatively larger power consumption, heat generation, lower speed, etc., will be beneficial. For example, if the power consumed, heat generated, etc. by the circuit elements, communication circuits, communication routes, etc. within computational functional block 102 is offset by improved precision at the higher-precision precision level. In these embodiments, when a difference in the behavior of the computational functional block between executing the test portion of the workload at the higher-precision precision level and the lower-precision precision level exceeds the threshold, controller functional block 104 selects the higher-precision precision level to be used for executing the remaining portion of the workload. Otherwise, controller functional block 104 selects the lower-precision precision level to be used for executing the remaining portion of the workload.

In some embodiments, above-described thresholds, i.e., the threshold to which the behavior(s) of computational functional block 102 are compared when executing a test portion at one or more precision levels, are specified in advance, computed, or otherwise acquired by controller functional block 104. For example, the one or more thresholds may be set based on theoretical values for the behavior or for the difference in behaviors. As another example, the one or more thresholds may be set by determining experimental/actual values by executing known workloads (which may be the workload or other workloads) one or more times. As yet another example, the one or more thresholds may be set by monitoring prior executions of the workload. In some embodiments, the one or more thresholds may be dynamically updated. For example, the thresholds may be updated based on operating conditions in electronic device 100, based on a software application that is executing, based on characteristics of the workload, based on results of workloads, based on behavior of computational functional block 102 while executing one or more workloads, etc.

In some embodiments, computational functional block 102 and/or controller functional block 104 are arranged within electronic device 100 with respect to one another and/or other functional blocks to enable more efficient switches between precision levels. For example, in some embodiments, precision level handling circuitry in computational functional block 102 and/or controller functional block 104 (e.g., conversion logic for handling changes between precision levels for operands and/or results such as truncation, conversion, bit padding, etc.) is communicatively coupled to, and may be physically placed near, caches, register files, or other circuit elements to enable rapid changes and conversions between precision levels. In some embodiments, some or all of the precision level handling circuitry may be located and/or communicatively coupled elsewhere, and more complex operations (e.g., cache flushes, etc.) may be used for handling changes between precision levels.

Memory functional block 106 is a memory in electronic device 100 (e.g., a "main" memory), and includes memory circuits such as one or more dynamic random access memory (DRAM), double data rate synchronous DRAM (DDR SDRAM), non-volatile random access memory (NVRAM), and/or other types of memory circuits for storing data and instructions for use by functional blocks in electronic device 100, as well as control circuits for handling accesses of the data and instructions that are stored in the memory circuits.

In some embodiments, switching between precision levels and/or using various precision levels for operands and/or results includes performing operations for ensuring that data (operands, results, etc.) is properly stored in and/or retrieved from memory functional block 106. For example, consider embodiments where data is read from and written to memory in 64 byte cache lines using eight reads or writes (or "bursts") of 64 bits. In some of these embodiments, when storing lower-precision results such as 32 bits into memory, computational functional block 102 and/or memory functional block 106 ensure that 32 bit result values are aligned with boundaries within the memory, such as 64 bit memory burst boundaries. As another example, when lower precision results such as 32 bit results are stored in memory, the lower precision results may be stored within a specified set of bits, e.g., the lowest 32 bits, and other bits in the portion may be ignored, written with specified values, etc.—and may be identified (such as via metadata) as being lower-precision data. Note, however, that, in some embodiments, the lower-precision results are only used internally in computational functional block and only full higher-precision values (perhaps padded, bit extended, etc. from lower-precision values) are stored in the memory.

Although electronic device 100 is simplified for illustrative purposes, in some embodiments, electronic device 100 includes additional or different functional blocks, subsystems, elements, and/or communication paths. For example, electronic device 100 may include display subsystems, power subsystems, I/O subsystems, etc. Electronic device 100 generally includes sufficient functional blocks, etc. to perform the operations herein described.

Electronic device 100 can be, or can be included in, any device that performs computational operations. For example, electronic device 100 can be, or can be included in, a desktop computer, a laptop computer, a wearable computing device, a tablet computer, a piece of virtual or augmented reality equipment, a smart phone, an artificial intelligence (AI) device, a server, a network appliance, a toy, a piece of audio-visual equipment, a home appliance, a vehicle, etc., and/or combinations thereof.

Interaction Between Hardware and Software Entities for Selecting a Precision Level and Using a Selected Precision Level In the described embodiments, a controller functional block (e.g., controller functional block 104), based on a behavior of the computational functional block (e.g., computational functional block 102) while executing a test portion of a workload, selects a precision level at which the computational functional block is to operate while executing a remainder of the workload. In some embodiments, the controller functional block can also receive requests, hints, specifications or other indications from other entities in electronic device 100 regarding the precision level(s) to be checked, a preferred precision level to be used, and/or other information relating to changes in precision level. For example, a hardware entity (e.g., a functional block, etc.) or software entity (e.g., a software application, an operating system, a kernel for a GPGPU, firmware, etc.) may request that the controller functional block use two or more specified precision levels as candidates for configuring the computational functional block. The controller functional block then monitors and compares the behavior of the computational functional block while executing a test portion of a workload at each of the two or more specified precision levels (the workload may be a workload executed for the hardware entity or software entity or another workload), so that one of the two or more specified precision levels is selected for executing a remaining portion of the workload. As another example, a hardware entity or software entity may provide threshold(s) to which the behavior of the computational functional block is compared for selecting a precision level. As yet another example, a hardware entity or software entity may provide a preferred precision level, so that the preferred precision level is used for configuring the computational functional block unless one or more conditions occur.

In some embodiments, the electronic device (e.g., electronic device 100) has, stored in a memory (e.g., memory functional block 106), two or more different versions of software applications for which workloads are executed. In these embodiments, each version of a software application is compiled or otherwise arranged to use operands and/or results of a different precision level (e.g., 16 bit operands and/or results, 32 bit operands and/or results, etc.). In these embodiments, at least a portion (e.g., the entire application, one or more subroutines or methods in the application, a library associated with the software application, etc.) of each version of a software application is compiled or otherwise arranged so that the corresponding precision level is used. In some of these embodiments, when using a selected precision level for executing a workload associated with a multi-version software application, the controller functional block causes the computational functional block to use the corresponding version of the software application. For example, when the computational functional block is a GPGPU or a compute unit in a GPGPU and the electronic device includes multiple versions of a kernel, the controller functional block may cause the computational functional block to execute the workload using a version of the kernel that is compiled or otherwise arranged to use operands and/or results of the selected precision level. The controller functional block may also disable circuit elements that are unused for executing the workload using the particular version of the software application as described herein.

In some embodiments, instructions used for executing workloads include "generic" instructions that do not specify, in the instruction, a precision level, but instead are configurable at runtime to use a particular precision level. For example, instructions in an instruction set architecture (ISA) used for executing workloads may include generic mathematical instructions, logical instructions, bitwise operation instructions, vector instructions, etc. that do not include a specification of a precision level/bit width of operands and/or results, but instead are configured at runtime to use a particular precision level/bit width. Before or as a generic instruction is executed, an executing entity (e.g., computational functional block 102) uses a configuration value or other setting (e.g., in a dedicated register, etc.) to determine which precision level is to be used. In some embodiments, pre-processing is performed before generic instructions are executed at runtime to configure the generic instructions to use a specified precision level. For example, the computational functional block may preprocess software code to replace generic instructions with dedicated instructions that use a specified precision level as a "just in time" configuration of the software code immediately prior to execution. In some embodiments, legacy software applications (i.e., software applications that were not originally written with generic instructions) may be compiled or otherwise amended/updated after compilation to use generic instructions, including by preprocessing the legacy software applications at runtime.

In some embodiments, the computational functional block uses the precision level specified by the controller functional block, regardless of precision level(s) specified in program code in a software application. In other words, the controller functional block includes mechanisms for recognizing particular software application workloads that may benefit from an adjusted precision level, monitoring the behavior of a test portion of the workloads, and selecting a precision level for executing a remaining portion of the workloads as described herein. In some of these embodiments, the software application workloads that are recognized by the controller functional block may have specified patterns or types of instructions, operations, etc. that are amenable to the use of different precision levels. For example, processing operations for training a neural network to perform classification tasks (e.g., speech recognition, etc.) and/or using the trained neural network to perform classification tasks may be amenable to use of precision levels lower than those implemented in program code. Generally, this means that hardware entities in the electronic device, i.e., the computational functional block and the controller functional block, can override or otherwise control the behavior of program code as the program code is executed by computational functional block (i.e., at the "hardware" level) so that a precision level different than a precision level specified in the program code is used.

Selecting a Precision Level for Executing a Workload

Figure 4:
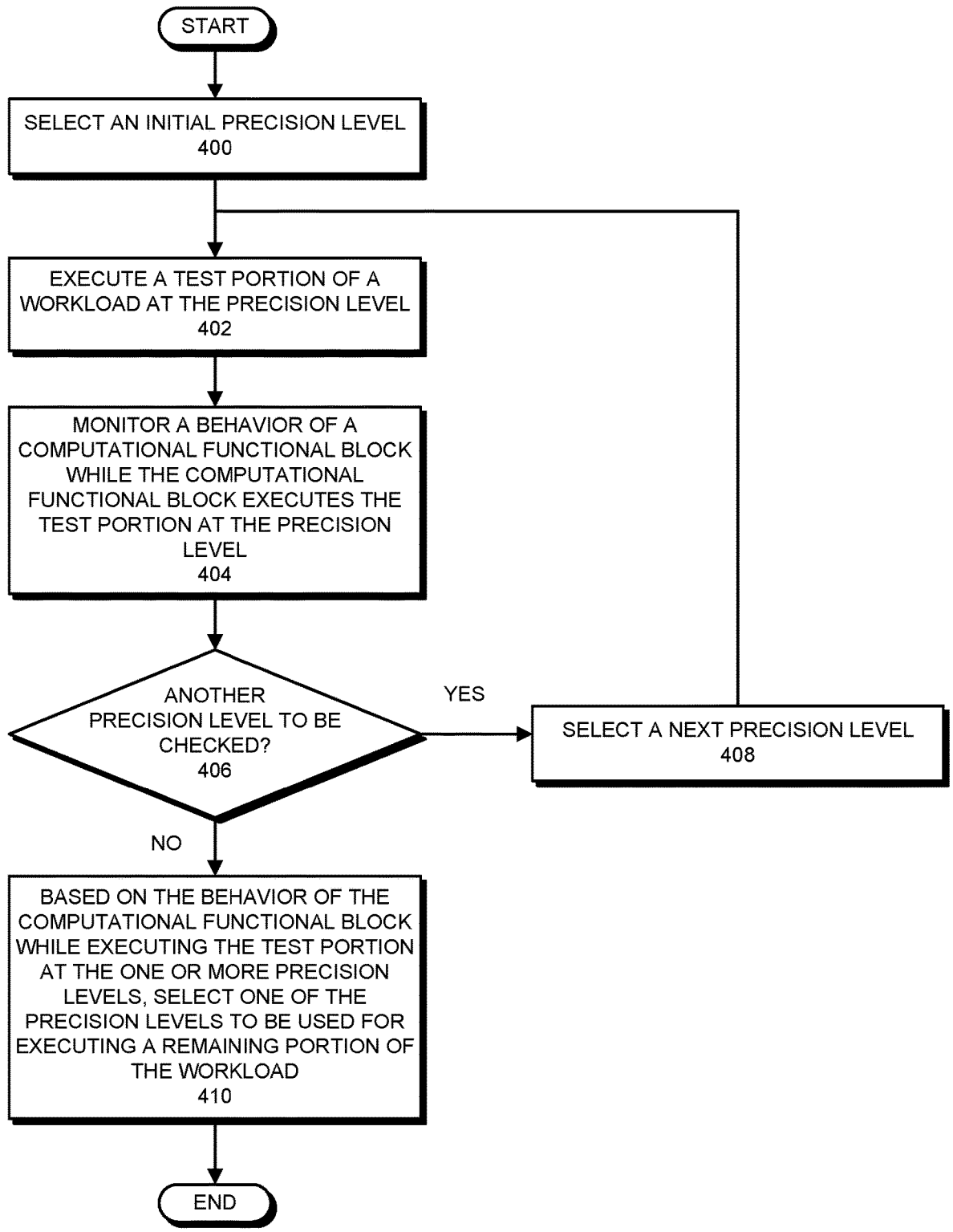
FIG. 4 presents a flowchart illustrating a process for selecting a precision level in accordance with some embodiments.

The described embodiments perform operations for selecting precision levels for executing workloads in an electronic device. FIG. 4 presents a flowchart illustrating a process for selecting a precision level in accordance with some embodiments. Note that the operations shown in FIG. 4 are presented as a general example of functions performed by some embodiments. The operations performed by other embodiments include different operations and/or operations that are performed in a different order. Additionally, although certain mechanisms are used in describing the process (e.g., computational functional block 102, controller functional block 104, etc.), in some embodiments, other mechanisms can perform the operations.

For the example shown in FIG. 4, a workload is described using processing operations for a neural network. The described embodiments are not limited, however, to performing processing operations for a neural network. The described embodiments can generally be used for performing any operations for which a precision level can be selected as described herein. For example, the described embodiments can be used for selecting precision levels for "inexact" operations for which results may be sufficiently accurate without requiring higher-precision inputs and/or results. These operations can include operations that produce low-precision results (with a limited number of decimal places, etc.), for trend analysis, etc.

In some embodiments, a precision level, such as a precision level specified (or "statically" specified) by a programmer for a software application in which the above-described neural network is implemented, may be unnecessarily high. In other words, the programmer that programmed the neural network may have specified a precision level that is higher than necessary to generate correct results from the neural network. For this reason, if the original precision level is used, the computational functional block may unnecessarily consume electrical power, operate more slowly than necessary, consume more communication system bandwidth and power, etc. In some embodiments, the controller functional block, using operations similar to those shown in FIG. 4, can override a statically specified precision level with dynamically selected precision level. In these embodiments, the controller functional block can perform the operations of FIG. 4 to determine if a given precision level (e.g., a lower-precision precision level than that specified in the software application) is adequate for executing the workload and can use that precision level, despite what might be specified in the software application. Note, however, that the precision level that is specified in the software application may still be selected by the controller functional block for executing the remaining portion of the workload—the statically specified precision level need not be overridden in every case and may be beneficial to use. For example, the statically specified precision level may be compared to one or more other precision levels as in FIG. 4 to determine if the benefit of the statically specified precision level outweighs the cost of using the statically specified precision level when compared to one or more lower-precision precision levels. If so, the statically specified precision level may be used to execute the remaining portion of the workload.

The process shown in FIG. 4 starts when a controller functional block (e.g., controller functional block 104) selects an initial precision level (step 400). For example, the controller functional block may automatically select a specified precision level from among a set of precision levels that include at least a higher-level precision level and a lower-level precision level. As another example, the controller functional block may receive or otherwise acquire, from another hardware or software entity, a request, hint, or instruction to select a particular precision level and may select the precision level based thereon. For example, a software application may provide a hint or other indication, such as the above-described static specification or a dedicated hint, that the controller functional block should use a particular precision level for executing a workload for the software application.

In the described embodiments, a precision level corresponds to a bit width or number of bits for operands and/or results of operations. For example, precision levels may be 8 bits, 16 bits, 64 bits, 128 bits, etc. By selecting a specified precision for "operands" alone, the described embodiments may use particular bit widths as inputs and values for computations such as mathematical, logical, etc. computations, thereby arriving at computational results in the same bit width, but may not store results using the same bit width. For example, 16 bit values may be used for computations, but 128 bit or 64 bit values may be stored in (and read from) a memory or a cache. By selecting a specified precision for "results" alone, the described embodiments may use particular bit widths for storing results independent of the bit widths used for computations, such as using 32 bits for storing results, but using 64 bits for computations. In some embodiments, storing a result from a lower-precision computation in a higher-precision format includes bit padding the result, extending a most-significant bit of the result, converting the result, ignoring certain bits, etc., and storing a result from a higher-precision computation in a lower-precision format includes truncating the result, rounding the result, converting the result, etc.

The controller functional block then executes a test portion of a workload at the precision level (step 402). Generally, a "test portion" is a portion of a workload that is sufficiently large to determine if there is a benefit to executing the workload at a given precision level, without being large enough to be inefficient (such as when the test portion is re-run several times at different precision levels). A test portion can include any number of operations from the workload, but typically includes only a small (and sometimes very small) subset or proportion of a set of operations for the workload. For example, a test portion of a neural network classification task workload may include a few thousand classification tasks (e.g., image identification, speech recognition, etc.) out of millions of classification tasks in the workload.

For executing the test portion of the workload at the precision level, the controller functional block configures the computational functional block to use the precision level and then causes the computational functional block to execute the test portion of the workload. For example, the controller functional block can cause, via selection logic in the computational functional block, the computational functional block to disable unused circuit elements or portions thereof for other precision levels. The controller functional block can then cause the computational functional block to execute the test portion using circuit elements or portions thereof that remain active—and a corresponding version of a software application, when such a version is available. For example, controller functional block can cause the computational functional block to execute, as the test portion, a specified portion of the workload (e.g., a number of iterations of a loop in program code, etc.) and/or can cause computational functional block to execute the workload for a given amount of time, until a given result value is reached, using only a portion of the available input information (such as a limited subset of a set of images to be classified using a neural network), etc. The particular operations performed when executing the test portion of the workload depend on the nature of the workload, but the operations can include mathematical, logical, or bitwise operations performed using operands and/or results of the precision level. For example, for the neural network, computational functional block may, when executing the test portion of the workload, compute weight values for inputs to nodes in the neural network, may calculate the result of activation functions, etc., which may be implemented using matrices and corresponding mathematical operations.

While the computational functional block executes the test portion of the workload at the precision level, the controller functional block monitors a behavior of the computational functional block (step 404). Generally, monitoring a "behavior" of computational functional block involves keeping track of one or more aspects, parameters, or metrics of the execution so that the execution of the test portion at the precision level can be evaluated as part of subsequent operations for determining a precision level at which the remainder of the workload is to be executed. The behavior can include any hardware or software values that may be used for the decision, such as a time taken for performing operations or operation completion rate, a communication bus bandwidth consumed, values or average values of one or more results, convergence rates for results, a number of iterations performed to reach a specified result or execution value, an amount of change in results between two or more operations, an average change in results over a specified number of results, a use or idleness of the computational functional block hardware, an amount of electrical power used, an amount of heat generated, etc. For example, when executing the test portion for the neural network classification workload, controller functional block may monitor values of classification results (e.g., values of the likelihood of an image including a specified element such as a face or a dog), average values of results, etc. During the monitoring, the controller functional block may keep one or more records that can subsequently be used for selecting the precision level to be used for the remainder of the workload. For example, the controller functional block may keep a running average value of results of operations in the test portion of the workload, etc.

The controller functional block then determines whether another precision level is to be checked (step 406). During this operation, computational functional block determines if there is at least one more precision level at which the test portion of the workload is to be executed while the behavior of computational functional block is monitored. In some embodiments, test portions of the workload can be executed at each of two or more precision levels in order to monitor the behavior of the computational functional block at each of the precision levels. If no other precision levels remain to be checked (step 406), the controller functional block proceeds to step 410 to determine the precision level to be used to execute the remaining portion of the workload, as described below.

If another precision level is to be checked (step 406), the controller functional block selects a next precision level (step 408). For example, the controller functional block may automatically select the next precision level from among the set of precision levels that include at least a higher-level precision level and a lower-level precision level, such as by using a list or table of precision levels to be checked. As another example, the controller functional block may receive or otherwise acquire, from another hardware or software entity, a request, hint, or instruction to select a particular next precision level and may select the next precision level based thereon. For example, a software application may provide a hint or other indication that the controller functional block should use a particular next precision level.

After selecting the next precision level, the controller functional block returns to step 402 to execute the test portion of the workload at the precision level (i.e., the selected next precision level) (step 402). During subsequent progression through steps 402-404 (which are described above), controller functional block monitors the behavior of the computational functional block as the computational functional block executes the test portion of the workload at the next precision level.

When no other precision levels are to be checked, e.g., when the computational functional block has executed the test portion of the workload at a last of a list of precision levels (step 406), the controller functional block determines a precision level for executing a remaining portion of the workload. During this operation, based on the behavior of the computational functional block while executing the test portion at the one or more precision levels, the controller functional block selects one of the precision levels for executing a remaining portion of the workload (step 410). During this operation, the controller functional block compares the behavior to at least one threshold and determines, based on the comparison, which precision level is to be used for executing the remaining portion of the workload.

In some embodiments, the test portion of the workload is executed at only one precision level. In these embodiments, a behavior such as an amount of time to complete executing the test portion, a value or average value of some or all of the results of the test portion, a number of iterations to reach a specified result value, an amount of electrical power used, etc. can be compared to a corresponding threshold. For example, in an embodiment where the workload is processing operations for a neural network that is used for finding a given word in snippets of recorded speech, an average classification result value (e.g., an output value between zero and one that is generated by processing the snippet using the neural network, the output value representing the likelihood that a snippet includes the given word) can be compared to a threshold such as a value between zero and one. When the behavior exceeds the threshold, a first precision level can be selected to be used for executing the remainder of the workload. When the behavior does not exceed the threshold, a second precision level can be selected to be used for executing the remaining portion of the workload. (The first precision level or the second precision level may be the precision level at which the test portion of the workload was executed.) As described above, in some embodiments, the first precision level is a higher-precision precision level than the second precision level. In these embodiments, the threshold can be set to represent a point at which a benefit of executing the remaining portion of the workload at the first/higher-precision precision level outweighs the costs in terms of electrical power consumed, heat generated, time taken, etc. In other words, the threshold can be set to indicate when the more desirable aspects of using the higher-precision precision level, in terms of more precise operands and/or results, balances the less desirable aspects of using the higher-precision precision level, such as electrical power consumption, heat generated, time taken, etc.

In some embodiments, the test portion of the workload is executed at two or more precision levels. In these embodiments, a behavior such as an amount of time to complete executing the test portion, a value or average value of some or all of the results of the test portion, a number of iterations to reach a specified result value, an amount of electrical power used, etc. that is determined while executing the test portion at each of the precision levels can be compared to one or more corresponding thresholds. In some of these embodiments, a difference in the behavior at some or all of the monitored precision levels can be checked—so that the difference in behavior is the "behavior" checked in step 410. For example, in an embodiment where the workload is processing operations for a neural network that is used for finding a given word in snippets of recorded speech, an average classification result value determined when executing the test portion at each precision level or a difference therein can be compared to a threshold such as a value between zero and one. When the behavior exceeds the threshold, a first precision level can be selected to be used for executing the remainder of the workload. When the behavior does not exceed the threshold, a second precision level can be selected to be used for executing the remaining portion of the workload. As described above, in some embodiments, the first precision level is a higher-precision precision level than the second precision level. In these embodiments, the threshold can be set to represent a point at which a benefit of executing the remaining portion of the workload at the first/higher-precision precision level outweighs the costs in terms of electrical power consumed, heat generated, time taken, etc. In other words, the threshold can be set to indicate when the more desirable aspects of using the higher-precision precision level, in terms of more precise operands and/or results, balances the less desirable aspects of using the higher-precision precision level, such as electrical power consumption, heat generated, time taken, etc.

Using a Selected Precision Level for Executing a Workload

Figure 5:
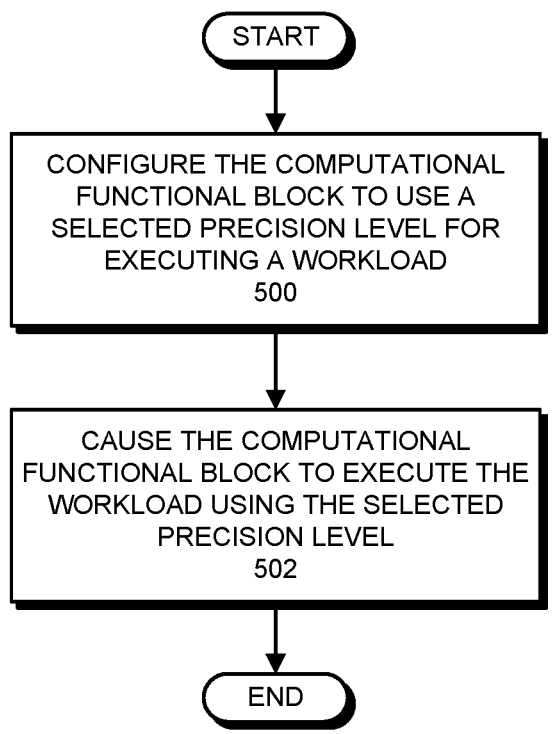
FIG. 5 presents a flowchart illustrating a process for using a selected precision level to execute a workload in accordance with some embodiments.

The described embodiments perform operations for using selected precision levels for executing workloads in an electronic device. FIG. 5 presents a flowchart illustrating a process for using a selected precision level to execute a workload in accordance with some embodiments. Note that the operations shown in FIG. 5 are presented as a general example of functions performed by some embodiments. The operations performed by other embodiments include different operations and/or operations that are performed in a different order. Additionally, although certain mechanisms are used in describing the process (e.g., computational functional block 102, controller functional block 104, etc.), in some embodiments, other mechanisms can perform the operations.

For the example shown in FIG. 5, the operations are assumed to follow the operations shown in FIG. 4. In other words, the operations shown in FIG. 4 are/were performed to select a precision level and the workload described in FIG. 5 is the "remaining portion" of a workload that is shown in FIG. 4. Although this example is presented, in some embodiments, the precision level is selected differently than in FIG. 4 and the workload is a workload other than the remaining portion of FIG. 4. For example, the computational functional block may automatically select the precision level from a list or table, may use a precision level specified in or indicated by software program code for the workload, etc. As another example, a workload other than a remaining portion may be executed, including workload that is executed without first checking one or more precision levels as shown in FIG. 4. In other words, in some embodiments, the controller functional block may simply select a precision level and execute a workload using the selected precision level. Generally, a precision level that is to be used for executing the workload is known before the commencement of the operations shown in FIG. 5.

For the example shown in FIG. 5, a workload is described using processing operations for a neural network. The described embodiments are not limited, however, to performing processing operations for a neural network. The described embodiments can generally be used for performing any operations for which a precision level can be configured as described herein.

The process shown in FIG. 5 starts when a controller functional block (e.g., controller functional block 104) configures a computational functional block (e.g., computational functional block 102) to use a selected precision level to execute a workload (step 500). During this operation, the controller functional block communicates with selection logic in the computational functional block (e.g., selection logic 206, selection logic 302, etc.) to cause the selection logic/computational functional block to perform operations such as disabling unused circuit elements or portions thereof. For example, if computational functional block includes separate circuit elements for executing the workload at each of a higher-precision precision level and a lower-precision precision level, and the selected precision level is the lower-precision precision level, controller functional block can cause computational functional block to disable the higher-precision precision level circuit elements, such as by powering down, reducing a supply voltage for, or reducing or halting a controlling clock for the circuit elements.

The controller functional block then causes the computational functional block to execute the workload at the selected precision level (step 502). During this operation, the controller functional block causes the computational functional block to execute the workload using circuit elements or portions thereof that remain active. When the electronic device has multiple versions of a software application for which the workload is executed, a corresponding version of a software application may also be used. The particular operations performed when executing the workload depend on the nature of the workload, but the operations can include mathematical, logical, or bitwise operations performed using operands and/or results of the precision level. For example, for the neural network, computational functional block may, when executing the test portion of the workload using the operands and/or results of the selected precision level, compute weight values for inputs to nodes in the neural network, may calculate the result of activation functions, etc., which may be implemented using matrices and corresponding mathematical operations.

In some embodiments, an electronic device (e.g., electronic device 100, and/or some portion thereof) uses code and/or data stored on a non-transitory computer-readable storage medium to perform some or all of the operations herein described. More specifically, the electronic device reads the code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, Accelerated Processing Units (APUs), system management units, power controllers, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., computational functional block 102, controller functional block 104, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
a hardware controller functional block; and
a hardware computational functional block;
wherein the controller functional block is configured to:
   while the computational functional block executes a same test portion of a workload at each of two or more precision levels, monitor a behavior of the computational functional block;
   based on the behavior of the computational functional block while executing the test portion of the workload at the two or more precision levels, select a given precision level from among a set of two or more precision levels at which the computational functional block is to execute a remaining portion of the workload; and
   configure the computational functional block to execute the remaining portion of the workload at the given precision level, the configuring including setting circuit elements in the computational functional block to execute the remaining portion of the workload at the given precision level.

2. The electronic device of claim 1, wherein selecting the given precision level comprises:
when the behavior of the computational functional block while the computational functional block executes a test portion of a workload at a particular one of the precision level from among the two or more precision levels exceeds at least one threshold, selecting the particular one of the precision levels as the given precision level; and
otherwise selecting a different precision level from among the set of two or more precision levels.

3. The electronic device of claim 1, wherein:
executing the test portion of the workload at each of the two or more precision levels comprises executing the test portion of the workload at each of a higher-precision precision level and a lower-precision precision level; and
selecting the given precision level comprises:
   when a difference in the behavior of the computational functional block when executing the test portion of the workload at the higher-precision precision level and the lower-precision precision level exceeds a threshold, selecting the higher-precision precision level as the given precision level; and
   otherwise, selecting the lower-precision precision level as the given precision level.

4. The electronic device of claim 2, wherein:
the behavior of the computational functional block comprises a number of iterations performed when executing the test portion of the workload; and
the threshold is a specified value of a number of iterations.

5. The electronic device of claim 2, wherein:
the behavior of the computational functional block comprises at least one result generated when executing the test portion of the workload; and
the threshold is a specified value of the at least one result.

6. The electronic device of claim 2, wherein:
the behavior of the computational functional block comprises an amount of change between results of specified operations when executing the test portion of the workload; and
the threshold is a specified value of an amount of change.

7. The electronic device of claim 1, wherein:
the electronic device comprises a plurality of versions of a software application for which the workload is executed, each version of the software application configured to perform operations using at least one of operands or results of a different precision level from among the set of two or more precision levels;
executing the test portion of the workload at the at least one precision level comprises executing the test portion using a corresponding version of the software application; and
configuring the computational functional block to execute the remaining portion of the workload at the given precision level comprises configuring the computational functional block to use a given version of the software application.

8. The electronic device of claim 1, wherein:
the electronic device comprises a software application for which the workload is executed, the software application including generic instructions that are dynamically configurable to use data of precision levels from among the set of two or more precision levels;
executing the test portion of the workload at the at least one precision level comprises executing the test portion using the software application with the generic instructions configured to use at least one of operands or results of a corresponding precision level; and
configuring the computational functional block to execute the remaining portion of the workload at the given precision level comprises configuring the computational functional block to use the software application with the generic instructions configured to use at least one of operands or results of the given precision level.

9. The electronic device of claim 1, wherein the controller functional block is further configured to receive a specification of the at least one precision level for executing the test portion of the workload.

10. The electronic device of claim 1, wherein the test portion includes a small proportion of operations for the workload and the remaining portion includes a large proportion of operations for the workload, the small proportion being one or more orders of magnitude smaller in number of operations for the workload than the large proportion.

11. The electronic device of claim 1, wherein the precision levels are characterized at least in part by a number of bits used for at least one of operands or results when performing operations, each precision level having a different number of bits.

12. The electronic device of claim 1, wherein the controller functional block performs the monitoring, selecting, and configuring one or more times during a runtime of the electronic device, thereby dynamically configuring a precision level of the computational functional block for executing the workload or other workloads.

13. The electronic device of claim 1, wherein the workload comprises operations for one of a neural network, a limited precision computation, a counter, a machine learning or deep learning application, a video or audio processing application, or a trend analysis.

14. A method for operating an electronic device that comprises a hardware controller functional block and a hardware computational functional block, the method comprising:
by the controller functional block:
   while the computational functional block executes a same test portion of a workload at each of two or more precision levels, monitoring a behavior of the computational functional block;

based on the behavior of the computational functional block while executing the test portion of the workload at the two or more precision levels, selecting a given precision level from among a set of two or more precision levels at which the computational functional block is to execute a remaining portion of the workload; and configuring the computational functional block to execute the remaining portion of the workload at the given precision level, the configuring including setting circuit elements in the computational functional block to execute the remaining portion of the workload at the given precision level.

15. The method of claim 14, wherein selecting the given precision level comprises:

when the behavior of the computational functional block while the computational functional block executes a test portion of a workload at a particular one of the precision level from among the two or more precision levels exceeds at least one threshold, selecting the particular one of the precision levels as the given precision level; and otherwise selecting a different precision level from among the set of two or more precision levels.

16. The method of claim 14, wherein:

executing the test portion of the workload at each of the two or more precision levels comprises executing the test portion of the workload at each of a higher-precision precision level and a lower-precision precision level; and selecting the given precision level comprises:

when a difference in the behavior of the computational functional block when executing the test portion of the workload at the higher-precision precision level and the lower-precision precision level exceeds a threshold, selecting the higher-precision precision level as the given precision level; and otherwise, selecting the lower-precision precision level as the given precision level.

17. The method of claim 15, wherein:

the behavior of the computational functional block comprises a number of iterations performed when executing the test portion of the workload; and the threshold is a specified value of a number of iterations.

18. The method of claim 15, wherein:

the behavior of the computational functional block comprises at least one result generated when executing the test portion of the workload; and the threshold is a specified value of the at least one result.

19. The method of claim 14, wherein:

the electronic device comprises a plurality of versions of a software application for which the workload is executed, each version of the software application configured to perform operations using at least one of operands or results of a different precision level from among the set of two or more precision levels;

executing the test portion of the workload at the at least one precision level comprises executing the test portion using a corresponding version of the software application; and configuring the computational functional block to execute the remaining portion of the workload at the given precision level comprises configuring the computational functional block to use a given version of the software application.

20. The method of claim 14, wherein:

the electronic device comprises a software application for which the workload is executed, the software application including generic instructions that are dynamically configurable to use data of precision levels from among the set of two or more precision levels;

executing the test portion of the workload at the at least one precision level comprises executing the test portion using the software application with the generic instructions configured to use at least one of operands or results of a corresponding precision level; and configuring the computational functional block to execute the remaining portion of the workload at the given precision level comprises configuring the computational functional block to use the software application with the generic instructions configured to use at least one of operands or results of the given precision level.

* * * * *